(12) United States Patent
Gupta

(10) Patent No.: US 7,493,266 B2
(45) Date of Patent: Feb. 17, 2009

(54) SYSTEM AND METHOD FOR MANAGEMENT OF HEALTH CARE SERVICES

(76) Inventor: Amit K. Gupta, 124 Brookstone Dr., Princeton, NJ (US) 08540

( * ) Notice: Subject to any disclaimer, the term of this patent is extended or adjusted under 35 U.S.C. 154(b) by 955 days.

(21) Appl. No.: 10/103,267

(22) Filed: Mar. 20, 2002

(65) Prior Publication Data

US 2003/0009355 A1   Jan. 9, 2003

(51) Int. Cl.
*G06Q 10/00*   (2006.01)
(52) U.S. Cl. ............................. 705/3; 705/2
(58) Field of Classification Search .............. 705/2–4
See application file for complete search history.

(56) References Cited

U.S. PATENT DOCUMENTS

| | | | |
|---|---|---|---|
| 5,136,502 A * | 8/1992 | Van Remortel et al. | 705/2 |
| 5,802,500 A * | 9/1998 | Ryan et al. | 705/36 R |
| 5,884,275 A * | 3/1999 | Peterson et al. | 705/7 |
| 5,950,169 A | 9/1999 | Borghesi et al. | |
| 5,976,082 A * | 11/1999 | Wong et al. | 600/300 |
| 6,014,632 A * | 1/2000 | Gamble et al. | 705/4 |
| 6,067,522 A | 5/2000 | Warady et al. | |
| 6,125,354 A | 9/2000 | MacFarlane et al. | |
| 6,151,586 A | 11/2000 | Brown | |
| 6,163,770 A | 12/2000 | Gamble et al. | |
| 6,235,176 B1 * | 5/2001 | Schoen et al. | 705/4 |
| 6,343,310 B1 | 1/2002 | DiRienzo | |
| 6,401,079 B1 * | 6/2002 | Kahn et al. | 705/30 |
| 6,434,531 B1 * | 8/2002 | Lancelot et al. | 705/3 |

(Continued)

FOREIGN PATENT DOCUMENTS

CA   2164235   *   6/1997

OTHER PUBLICATIONS

Vivius a healthcare system: Questions & Answers; http://www.vivius.com/faqemployer.asp.

(Continued)

*Primary Examiner*—C Luke Gilligan
*Assistant Examiner*—Vivek Koppikar
(74) *Attorney, Agent, or Firm*—Merchant & Gould P.C.

(57) ABSTRACT

The present invention is a system and method for management of consumer services such as health care services which combines new financial structure for health insurance and health benefit plan, payment methods, health plan design, benefit development algorithms, unique procurement methods for health care benefits with and without application to an individual consumer's personal state of health, and is integrated with financial services and asset management products, and benefits for an individual consumer's future medical and/or retirement savings, for healthcare needs. The method and system employs a combination of the defined benefit and defined contribution approaches which combination is referred to herein as "defined-care." Defined-care model or the healthcare asset management model has two primary components, one which is referred to herein as a "health management and retirement account", and the other of which is an infrastructure "connected portal" that interfaces through a technology platform with the health management and retirement accounts and the account holders. The foundation of this infrastructure according to the present invention is a technology platform across which a variety of processes are implemented. In the technology platform for the infrastructure of the present invention, the conventional processes and the new processes are integrated, thereby allowing a change to one process to be adopted by or otherwise accommodated by the other processes.

7 Claims, 12 Drawing Sheets

U.S. PATENT DOCUMENTS

| | | | |
|---|---|---|---|
| 6,735,569 | B1 | 5/2004 | Wizig |
| 6,792,410 | B1 | 9/2004 | Donovan et al. |
| 2001/0034618 | A1* | 10/2001 | Kessler et al. ............... 705/4 |
| 2002/0010597 | A1 | 1/2002 | Mayer et al. |
| 2002/0049617 | A1* | 4/2002 | Lencki et al. ............... 705/4 |
| 2002/0069085 | A1 | 6/2002 | Engel et al. |
| 2002/0087444 | A1* | 7/2002 | DiPiero et al. ............ 705/35 |
| 2002/0095316 | A1 | 7/2002 | Toan et al. |
| 2002/0149616 | A1* | 10/2002 | Gross et al. ............ 345/745 |
| 2002/0152097 | A1* | 10/2002 | Javors ....................... 705/2 |
| 2002/0169701 | A1* | 11/2002 | Tarbox et al. ............ 705/36 |
| 2005/0086075 | A1 | 4/2005 | Kachler et al. |

OTHER PUBLICATIONS

Vivius a healthcare system: Investors, http://www.vivius.com/partners.asp.

Vivius a healthcare system: Vivius Signs Agreement with Health Net to Provide Consumer-Driven Health Care Plan in Select U.S. Markets; http://www.vivius.com/PublicPressRelease.asp-?PressReleaseId=59&type=.

HealthMarket Self Directed Health Plans: HealthMarket Answers Your Questions; https://www.healthmarket.com/N/HMIQA.jsp.

HealthMarket Self Directed Health Plans: The HealthMarket Advantage; https://www.healthmarket.com/N/hmAdv.jsp.

Definity Health: Personal Care Account; http://www.definityhealth.com/marketing/account.html.

Definity Health: Consumer Control; http://www.definityhealth.com/marketing/advantage.html.

Definity Health: Join our team; http://www.definityhealth.com/marketing/z-AccountManager.html.

Lumenos: The Lumenos Program; http://www.lumenos.com/eprise/main/Public/Content/lumenos_program/at_a_glance.

Lumenos: Lumenos Brings Consumer-Driven Health Care Options to Benefitpoint® ; http://www.lumenos.com/press/seibel.

Lumenos: Lumenos Chooses Siebel Systems to Provide Personalized Customer Service for; http://www.lumenos.com/press/seibel.

National Center for Policy Analysis Idea House: NCPA—Health Issues—Defined Contribution Health Plans: Wave Of The Future? http://www.nepa.org/pi/health/pd121099c.html.

National Center for Policy Analysis Idea House: NCPA Opinion Editorial—Level the Playing Field for U.S. Health Insurance; http://www.ncpa.org/oped/goodman/jcg122199.html.

National Center for Policy Analysis Idea House: NCPA Opinion Editorial—BradleyCare: Two Steps Forward Six Steps Back; http://www.nepa.org/oped/goodman/jcg112299.html.

National Center for Policy Analysis Idea House: NCPA Opinion Editorial—Minimum Wage Hike and the Uninsured; http://www.ncpa.org/oped/goodman/jcg111199.html.

National Center for Policy Analysis Idea House: NCPA Opinion Editorial—Taxing the Poor; http://www.ncpa.org/oped/goodman/jcg102899.html.

National Center for Policy Analysis Idea House: NCPA Opinion Editorial—Gore Health Plan: One Step Forward, Three Steps Back; http://www.ncpa.org/oped/goodman/jcg91499.html.

National Center for Policy Analysis Idea House: NCPA Opinion Editorial—New Entitlement Not Needed for Prescription Drugs; http://www.ncpa.org/oped/goodman/jcg81899.html.

National Center for Policy Analysis Idea House: NCPA Opinion Editorial—Protect Patients From Congress; http://www.ncpa.org/oped/goodman/jcg71299.html.

National Center for Policy Analysis Idea House: NCPA Opinion Editorial—MSAs: South Africa Leads the Way; http://www.ncpa.org/oped/goodman/jcg7899.html.

National Center for Policy Analysis Idea House: NCPA Opinion Editorial—America Already Has School Choice; http://www.ncpa.org/oped/goodman/jcg7799.html.

National Center for Policy Analysis Idea House: NCPA Opinion Editorial—A Bill to Save Social Security; http://www.ncpa.org/oped/goodman/jcg51799.html.

National Center for Policy Analysis Idea House: NCPA Opinion Editorial—Reforming the U.S. Health Care System; http://www.ncpa.org/oped/goodman/jcg51099b.html.

National Center for Policy Analysis Idea House: NCPA Opinion Editorial—Texas Already Has School Choice; http://www.ncpa.org/oped/goodman/jcg51099a.html.

* cited by examiner

SYSTEM AND METHOD FOR MANAGEMENT OF HEALTH CARE SERVICES

BACKGROUND OF THE INVENTION

1. Field of the Invention

The invention relates generally to a new and improved automated system and method for facilitating management of individual benefits or assets, such as those of an employee or consumer of services, that is capable of interfacing with a variety of entities or "stakeholders" who will or who potentially will benefit, financially or in some other manner, for example, by the acquisition of goodwill. More particularly, the invention relates to a system which creates an infrastructure that is used to connect together consumers, employers, health care providers and health plans and their affiliates so as to combine the process of benefits management and enrollment with the remainder of the health care delivery system.

2. Description of the Related Art

Prior systems and methods of providing health care services and administering employee health care benefits have proven unsatisfactory in recent years for at least several reasons. Such systems and methods include the traditional "fee-for-service" or "indemnity" coverage model, the so-called "managed care", "HMO", "capitation" or "defined benefit" model, and the more recent "defined contribution" or "self-directed health plan" models. In the "fee-for-service' model, health care providers (e.g., physicians, clinics, hospitals and the like) bill patients whatever they deem appropriate for each visit or service rendered. If the patient has insurance, either the patient or the provider submits a claim for each visit or service and the insurance carrier determines how much of the provider's fee is eligible for reimbursement. If the amount the provider charged exceeds the amount the insurance company is willing to reimburse, it falls to the patient to make up the difference. The fee-for-service model has fallen into disfavor with employers, the insured and the insurers, because the available systems and methods for management and oversight of the various implementations of the model are less than efficient, increasing costly and vulnerable to mismanagement and even fraud.

In the "managed care", "capitation" or "defined benefit" model, a fixed per capita amount is paid to a provider for each person in the per capita population. Thus, the provider is not paid on a per visit or per service basis. The provider is paid the fixed amount for each participant in the health care plan regardless of how many office visits or laboratory tests or procedures are performed for a given patient or whether the patient ever avails the provider of services at all. The "Health Maintenance Organizations" or "HMO" is a ubiquitous example of a system based on the defined benefit model. There is dissatisfaction with defined benefit plans from the point of view of the employee/patient, the employer and the providers, at a minimum. The providers suffered financially in the transition from the fee-for-service system to the defined benefit model. Moreover, complicated administrative procedures mandated by the defined benefit plans before a provider can provide certain services lead to inefficiencies, provider overhead expenses, and situations in which non-physicians effectively are making decisions about what is best for a patient. The employee/patient is wary of defined benefit plans because the capitation model gives them concern that they may be denied a procedure that is otherwise indicated because of financial rather than medical reasons. The providers are faced with practical and very real cost/benefit analysis decisions, which arguably impact the provider's ability to provide the level of care that would be in the best interest of each patient. When employees/patients feel particularly aggrieved, the patients increasingly are bringing lawsuits against employers and health care plans. Employers likewise are unhappy with defined benefit plans because the cost of the premiums and of administering the plans is ever escalating and the bottom-line outcome of the employers' investment is not totally satisfying to the employees. The managed care/HMO plans are also designed as first-dollar coverage plans, insuring people from the very first dollar spent on healthcare. This type of coverage, along with the many preventative services covered under the plan design, with the perception to the patient that it only costs a small co-payment to visit a doctor, has led to the rise in premiums of these plans for employers.

The traditional "defined contribution" model dictates that employers allocate and distribute a predetermined sum for the purchase of health care benefits for employees, and the employees then are tasked with reviewing, selecting, and paying for their health care plan. A point of contrast of the defined benefit model with the defined contribution model thus is that in the former, the employers rather than the employees, review and select from among various health care plans and then offer those plans to employees. The defined contribution model ostensibly offers a significant benefit to employers, because the employers no longer have to deal directly or as intensely with administering the health care plans. Defined contribution health care has not been attractive to employees to date, however, because the terms of the health care plans are difficult to comprehend and are increasingly opaque in terms of benefits, services, providers and reimbursement protocols. In a traditional defined contribution model, the employees in theory have more control over their health benefits, because they can spend the employer's contribution howsoever they wish. In practice, though, the benefits plans are too complicated and inscrutable that employees risk choosing a plan that will not give them the minimal coverage they ought to have, and the plans similarly are too obtuse as to give an individual insight as to how best to take advantage of the contribution. In addition, these defined-contribution plans pose very high-deductibles for the employees/patients. The healthier employee may choose to accept such a plan, because of the potential to save money, whereas, the employee who may have a chronic debilitating illness, opts not to select this type of plan because of greater financial exposure to self, and thus, chooses for the low "out of pocket" cost HMO/managed care plan. This will result overtime in a greater divide between healthier and ill employees, causing "adverse selection" and even greater health benefit cost increases in the future.

Complicating the situation is the enactment and subsequent adjustment of federal regulations which impact the manner in which health care services are purchased, administered and provided which require existing systems in place at healthcare providers, employers and health care plans alike to be changed to insure compliance with the regulations. Such changes generally are costly and disruptive to the various entities involved and, if not implemented properly, can lead to non-compliance legal liability. One such regulation is the Health Insurance Portability and Accountability Act (HIPAA), the deadline for compliance with which is the end of 2002, middle of 2003. Provisions of HIPAA, for example, call for the following: unique identifiers for individuals, employers, healthcare providers, and health care plans; security features in administrative procedures, physical safeguards, technical services and technical mechanisms; privacy features in the form of modification of typical policies, procedures and systems in order to protect the confidentiality of medical records and patient's health information; and communication and data elements affecting transactions such as enrollment/disenrollment, eligibility/benefit inquiries, referral certification and authorization, submission of claims, coordination of benefits, reimbursement for claims, status of claims, and payment of premiums.

With the advent of the Internet, consumers are becoming more and more accustomed to being able to access information anytime and anywhere, and are increasingly using the world wide web to obtain health information and assistance in informed decision making. Accordingly, those skilled in the art have long recognized the need for an improved system and method for the management of health care services which is Internet-based and efficient, cost-effective from the point of view of the consumer. It is desirable to provide employers a new model for healthcare benefits that is cost-effective and reduces administrative burden, provides healthcare providers reimbursement in a timely manner, and provides technology to streamline communication with their members, clients, and providers. The present invention clearly fulfills all these needs.

SUMMARY OF THE INVENTION

Briefly, and in general terms, the present invention is a system and method for management of consumer services such as health care services which combines new financial structure for health insurance and health benefit plan, payment methods, health plan design, benefit development algorithms, unique procurement methods for health care benefits with and without application to an individual consumer's personal state of health, and is integrated with financial services and asset management products, and benefits for an individual consumer's future medical and/or retirement savings, for healthcare needs.

Driven by the Internet, and the ability to access information anytime, anywhere, the e-consumer who is increasingly using the Web today for health information and assistance in informed decision making, is also looking for alternative ways to manage his or her health information, his or her health care benefits, and health coverage information. The e-consumer demands a system that is increasingly transparent, having experienced the opposite to this point with an HMO. This greater transparency, greater choice and freedom to access health care services, and more flexibility and portability of the health care benefits, will be ignited by the transition of defined benefit health plans to consumer-centric health plans. Consumer-centric health plans refers to a health plan which is consumer focused or directed to bring consumer decision making into the economics of health care.

The method and system employs a combination of the defined benefit and defined contribution approaches which combination is referred to herein as "defined-care." The model of the present invention is referred to as a "defined-care model" or "healthcare asset management model", as a replacement for the "managed care" model, and an alternative to the traditional "defined contribution" model. The infrastructure system which will encompass this new model for healthcare benefits, finance, and delivery will be referred to as a Universal Health Management (UHM) system, consistent with the consumer-centric health plans. Although is contemplated that a system and method according to the present invention could be effectively and efficiently employed with respect to a wide variety of benefits or assets, the system and method is described herein in the context of health care. Defined-care model or the healthcare asset management model has two primary components, one which is referred to herein as a "health management and retirement account", and the other of which is an infrastructure "connected portal" that interfaces through a technology platform with the health management and retirement accounts and the account holders. The technology platform can be implemented using the Internet, an Intranet, enterprise resource planning software, or some combination thereof, and consumers and other participants in the infrastructure can interface with the infrastructure using the Internet, an Intranet, television, or some other appropriate communications medium. Through the vehicle of a health management and retirement account according to the present invention, consumers can be presented with a transparent system in which it is easy to understand and choose from the available benefits and that will prevent the consumer from inadvertently not selecting core health care benefits which are appropriate based on his or her population group or individual health risk characteristics. The core benefits will continue to be selected by the employers, with some combination of employee input, and include at the least catastrophic health insurance, with additional benefits such as healthcare provider network, prevention and wellness programs, and chronic illness case management programs.

The health management and retirement account is designed to provide clear and concise but nevertheless comprehensive information to the account holders about their health care pre-defined benefits (e.g., basic medical coverage in the event of a catastrophic injury and other mandatory medical coverage which is tied to a particular population group, such as the employer's employee group, into which a given account holder falls) as well as their options for using any funds allocated in their account (e.g., choosing from a plurality of other possible health, financial and insurance benefits suited to the account holder's particular needs or desires as an individual, or electing to enroll in a program which provides cash and/or health benefits as incentives for the account holder to achieve certain milestones related to disease prevention). Optionally, the health management and retirement account offers features which permit the account holder to invest any portion of their employer's contribution to their account, whether it is a contribution made in the beginning of the health plan policy year as in "defined contribution" or it is a "dividend" made at the end of the year as an incentive to the employee, based on their use of employer's allocated funds for covering their healthcare expenses during the plan policy year. At all times, it is ensured that an employee in an employee population group of an employer is covered by health insurance, primarily provided to cover catastrophes or expenses resulting from chronic illness, along with any additional group-level benefits that the employer determines are necessary to provide to their employees. The individual employee's selection of additional supplementary benefits is funded by funds that are contributed by employer at the beginning of the year in the individual employee's health management and retirement account, employer's contribution or "dividend" to the same account at the end of the year as an incentive for utilizing employer's healthcare benefit plan appropriately or judiciously (core mechanism to the "healthcare asset management model" for controlling rising healthcare costs), or employee's own contribution to the same account from either pre-tax or post-tax dollars, to cover immediate or future, long-term, or retirement healthcare expenses.

The entities that interface with the infrastructure are collectively termed "stakeholders" and these typically include employers, health care providers, health care plans, financial services and underwriters associated with the health care plans and benefits consultants and/or benefits management companies. The employers, who in traditional health care models shoulder the burden and, increasingly the liability associated with, the selection and administration of health care benefits, interface with this infrastructure, with their primary focus of interaction being obtainment of information necessary to ascertain an appropriate level of healthcare coverage for their employee group. This level of appropriate coverage includes catastrophic coverage for accidents and chronic illnesses, plus or minus a healthcare provider network to which their employees will have access to receive healthcare, and the necessary funding for their employees to ensure that they have adequate funds available to cover additional healthcare expenses as needed. These funds can be provided to employees as "defined contribution" funds in the beginning of the year in their personal, individually-owned health management and retirement account, or via funds set aside in a group coverage "checking" account for all employees, the use of which on a group and individual basis will determine end of the year employee "incentive dividends" which are then contributed to the individual employee's health management and retirement account. The infrastructure for employers further provides the human resources personnel and other staff of an employer, a benefit portal that allows management of financial funds for their employee groups, allows determination of appropriate "defined contribution" or "dividend" funds, management of healthcare benefits and health plan policies for their employee group, and administration of all benefit processes that include enrollment/disenrollment, COBRA/HIPAA compliance, manage compliance to all department of insurance and ERISA laws, definition and development of proper healthcare prevention and wellness programs for employees and management of disease management program provider vendors, and payment for healthcare services obtained by the employees.

The foundation of this infrastructure according to the present invention is a technology platform across which a variety of processes are implemented. Conventional processes traditionally have been performed outside of an infrastructure, such as claims processing as between insured employees or health care providers on the one hand, and health care plans or their financial services administrators or underwriters on the other hand. In the technology platform for the infrastructure of the present invention, the conventional processes and the new processes are integrated, thereby allowing a change to one process to be adopted by or otherwise accommodated by the other processes. Accordingly, the system and method of the invention can function smoothly and efficiently during change such as new or modified federal regulations affecting any or all of the stakeholders, thereby the expense and delay associated with achieving compliance with changes in the law can be minimized. Optionally, the technology platform includes a feature for determining a patient's eligibility for certain benefits either prior to a visit to the doctor or hospital or at the point of care (e.g., during the visit to the doctor's office or at the hospital's inpatient window), and a feature for prompt payment of healthcare services provided and/or pre-payment of services provided by healthcare providers/doctors when appropriate.

Other features and advantages of the present invention will become apparent from the following detailed description, taken in conjunction with the accompanying drawings, which illustrate by way of example, the features of the present invention.

Figure 1:
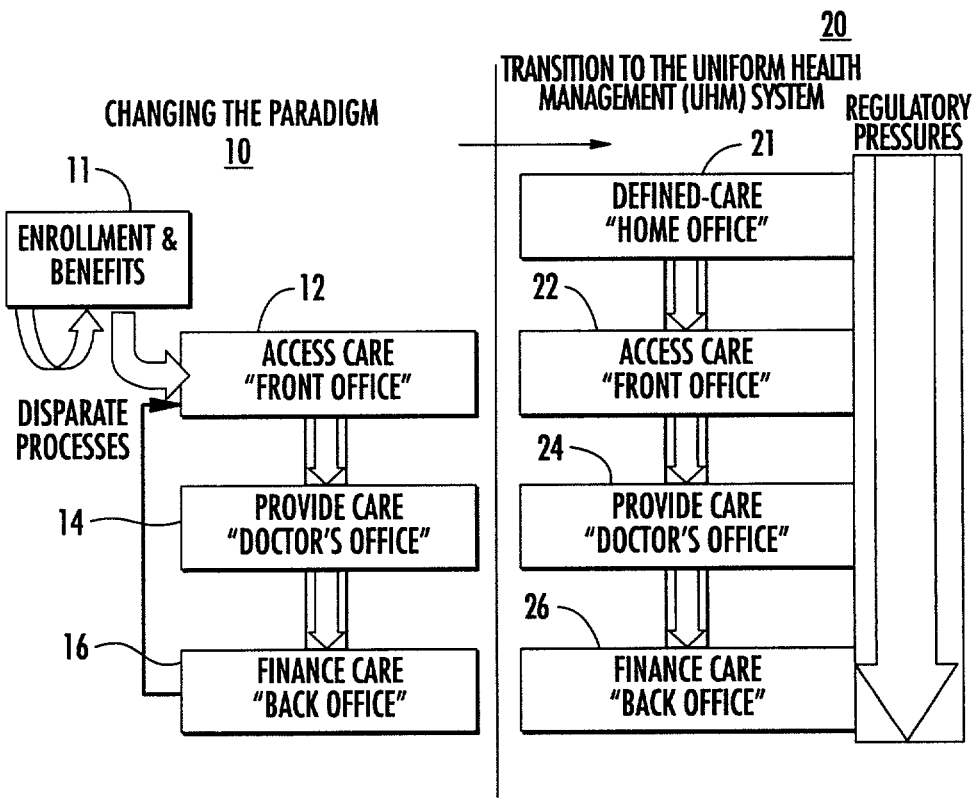
FIG. 1 is a schematic diagram illustrating the differences between a prior art paradigm for health care services and a paradigm in accordance with the systems and methods of the present invention.

Preferred embodiments of a system and method according to the invention are described in detail below with reference to figures.

DETAILED DESCRIPTION

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 illustrates a comparison of a prior art method for providing health care services 10 and uniform health management system 20 of the present invention. In the prior art method for providing health care services, enrollment and benefits 11 are disparate processes, which are performed by a patient's employer. Provide care "doctor's office" 14 communicates via paperwork or telephone with an insurance company which provides an access care "front office" 12 and finance care "back office" 16 for payment of the physician's services.

Uniform health management (UHM) system 20 of the present invention defines a consumer-centric healthcare model, consistent with the new movement towards consumer-driven health plans, and includes defined care "home office" 21. Defined care "home office" 21 provides a health management and retirement account (HMRA) and an infrastructure to connect together the HMRA, consumers, employees, health care providers and health plans and their affiliates for interacting with access care "front office" 22, provide care "doctor's office" 24 and finance care "back office" 26. Defined care focuses on an individual, who may or may not be part of a population group, such as an employer's group, and the baseline healthcare benefits provided to that individual by an employer supplemented by additional supplementary benefits of importance to the individual state of health. These benefits are funded by way of defined-contribution funds provided in the beginning of the year or incentive dividends provided by the employer at the end of the year. Defined care eliminates the focus of individuals from unknown and complicated "plans" and focuses on obtaining benefits for health care most important to them, therefore increasing overall transparency of the process, while taking an active role in the management of these benefits to assure health care and financial security. Defined-care also incorporates pre-definition of care-specific benefits, at group or individual level, which also directly associate with the actual care pathways and protocols used in the practice of medicine, as described in more detail below.

Figure 2:
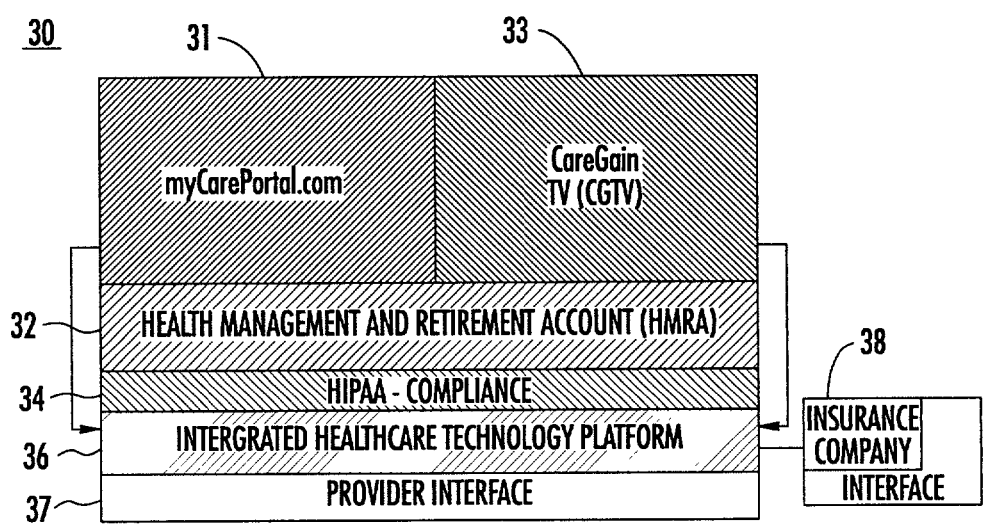
FIG. 2 is a schematic diagram of an implementation of an infrastructure for universal health management system according to the present invention.

FIG. 2 is a schematic diagram of an implementation of infrastructure 30 for defined care "home office," access care "front office" and provide care "doctor's office." Website 31 is a provider-patient portal to uniform health management (UHM) system. Website 31 provides patient access over a communications medium such as the Internet or an intranet to health management and retirement account (HMRA) 32. The patient can access health information and benefit details, financial information, and settlement of health management and retirement account (HMRA) 32 from website 31. Website 31 also can be used by the employees to communicate and select health care providers and insurance plan providers. Website 31 can also provide access to financial products and services. Website 31 can be personalized to provide personal health care content of products, services, health updates and news of interest to the patient. Website 31 can be used to provide online scheduling of services of a health care provider. Website 31 can provide an active health monitor to alert or remind an employee of scheduled or required health management services. For example, website 31 can be referred to as MyCarePortal.com. Alternatively, website 31 can be a software interface determined by a computer program.

Alternatively, television interface 33 provides patient access over a television channel to health management and retirement account (HMRA) 32. Television interface 33 can be used to access health management and retirement account (HMRA) 32 and details and settlement of health management and retirement account (HMRA) 32. Television interface 33 also can be used to communicate with health care providers, insurance plan providers and employers. Television interface 33 can provide access to financial products and services. Television interface 33 can be used to provide health care content. Television interface 33 can be used to provide scheduling of services.

Health Insurance Portability and Accountability Act (HIPAA) compliance module 34 provides an infrastructure to allow integrated health care technology platform 36 to be substantially or completely HIPAA compliant. Integrated health care technology platform 36 is an analytical engine for HMRA 32 to provide benefit deliverance, customization and administration of patient health care. Integrated health care technology platform 36 also provides a medical payment processing system. Integrated health care technology platform 36 provides an eligibility system, disease management system, utilization monitoring and compliance monitoring, as described in more detail below. Integrated health care technology platform 36 can also provide data connectors to physician profiling and directed marketing services. Provider interface 37 interfaces with health care technology platform 36 for medical payment processing which can be a real time point of care and claims based. Insurance company interface 38 provides an interface to an insurance provider for establishing plans of health care.

The deliverance of infrastructure 30 of the Universal Health Management (UHM) system or consumer-centric healthcare model can be different from conventional approaches. In one embodiment, the entry point for the market can be through the delivery of HMRA 32 to the employees and employers. Thereafter, the functionalities of integrated health care technology platform 36 can be delivered. Eventually, the integrated health care technology platform 36 can be integrated with website 31 and television interface 33.

Figure 3:
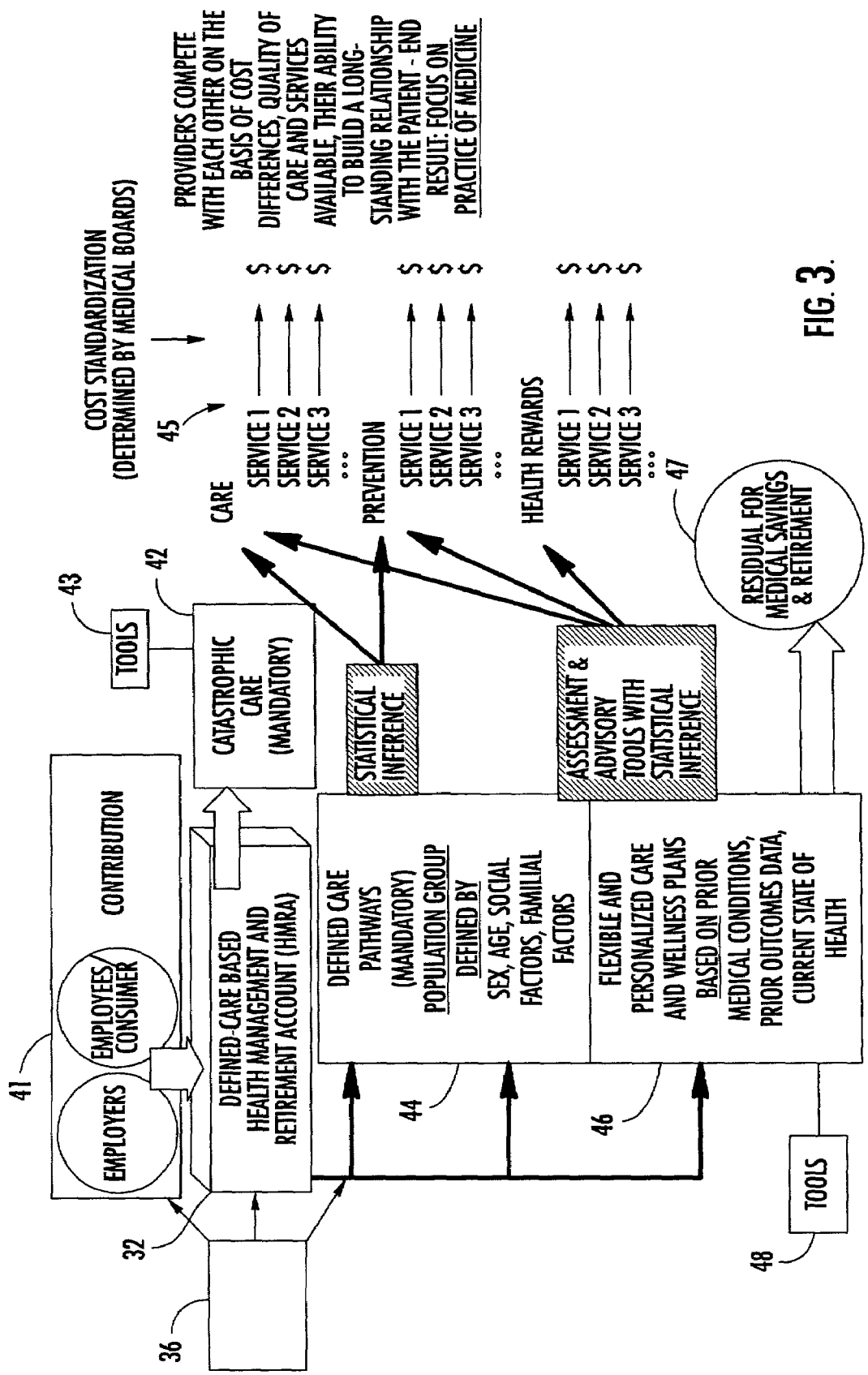
FIG. 3 is a schematic diagram of an embodiment of the uniform health management system for use in a selection process to determine mandatory health care benefits and defined care integrated pathways according to the present invention.

FIG. 3 is a schematic diagram of an implementation of uniform health care system 20 to provide a selection of mandatory health care benefits and defined care integrated pathways. The employers may self-fund the coverage of mandatory health benefits during any given implementation period for a health plan policy. Employers and employees/consumers also have contribution 41 to HMRA 32. Examples of methods for determining contribution 41 are described in more detail below. For example, there are at least three (3) methods for obtaining contributions into the HMRA of individual employees. First, the employer can make upfront contributions in the beginning of the year to allow employees to select benefits of interest to them above the standard, mandatory health benefits funded directly by the employer. Second, the employer may make an end-of-the-year "incentive dividend", to provide employees an incentive to use employer's self-funded benefits appropriately or judiciously during the health plan policy active year, and if the employees do so, they receive funds in their personal HMRA accounts to accumulate these funds to cover their and their dependents' future healthcare expenses. Third, the employees can individually make contributions into their HMRA account, either from pre-tax or post-tax dollars.

Catastrophic care module 42 determines a plan from a conventional insurance company and a cost for providing a catastrophic care benefit for an employee. Catastrophic care is a mandatory benefit for all employees. Catastrophic care analysis tools 43 can interface with catastrophic care module 42. Catastrophic care analysis tools 43 can include access to data of a comparative analysis of various insurance providers. One method of obtaining catastrophic insurance is from traditional "managed care" insurance companies, where a high-deductible health plan policy has at least $1000 for single coverage or $2000 for family coverage (i.e. $2000 single coverage/$4000 family coverage) is selected. These health plan policies are known as high-deductible preferred provider organization (PPO) plans, indemnity plans, major-medical plans, or "MSA companion" plans. The second method of obtaining catastrophic insurance is from re-insurance or property/casualty insurance providers, where a health plan policy is underwritten with a specific stop-loss at the desired high-deductible amount. The level at which the deductible or stop-loss is selected for the catastrophic insurance can be adjustable based on characteristics of the employer's employee group and/or occupational hazards associated with the employer (occupational injury risk level (OIRL)). Typically, an employer will access catastrophic care analysis tools 43 to determine mandatory catastrophic coverage for each employee. Catastrophic care module 42 can also determine additional occupational benefits based on an occupational injury risk benefit.

Defined care integrated pathways module 44 determines defined care integrated pathways for each employee or consumer. The defined care integrated pathway is a "package of services" that is linked to a "care pathway" that an individual belonging to a particular population group has. A population group is defined primarily by demographic information and/or certain social and family history related risk factors that determine a bulk of the care and preventative services within the care pathways. Defined care integrated pathways or plans define a set of care and preventative services that an individual should utilize based on certain pre-determined and inherited conditions and risk factors. The defined care integrated pathways can be designed by medical boards, physicians/practitioners, and medical directors belonging to various medical specialties. The goal of the defined care integrated pathways is to systematically achieve individual well being, by focusing on the "whole" individual receiving care of all systems to prevent progression and complications from an ailment. A defined care integrated pathway includes access to health care services for the purpose of diagnosis and treatment and also for the purpose of prevention. Defined-care integrated pathways can be funded by the employer in the beginning of its implementation, but in the future, these can be built as "carve-out" benefits covered under the healthcare benefit plan/insurance policy, activated automatically based on individual health status.

Figure 4:
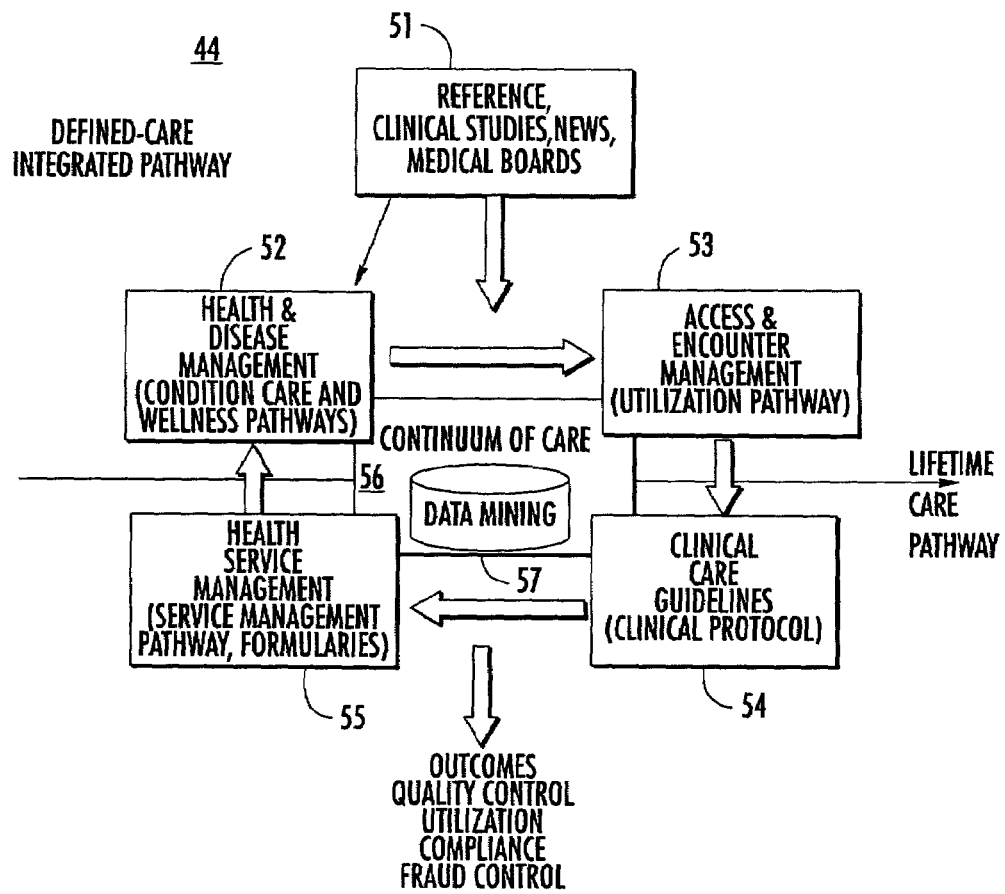
FIG. 4 is a schematic diagram of a defined care integrated pathway.

An example of an implementation of the defined care integrated pathway module 44 is shown in FIG. 4. Reference, clinical studies, medical board and news information 51 is used by health and disease management module 52 to determine condition care pathways and wellness pathways. Access and encounter management module 53 manages access and encounter of an individual with a health care provider. Access and encounter management module determines a utilization pathway of the utilization of health care providers by individuals. Clinical care guidelines module 54 determines a complete care protocol for a condition of an individual based on his/her characteristics, risk factors, prior medical conditions and health status through application of evidence-based medicine. Health service management module 55 determines a service management and formularies to determine respective types of services to be provided to the individual and drugs, which are approved for treatment of illnesses. Data 56 from health disease management module 52, access and encounter management module 53, clinical care guidelines module 54 and health service management module 55 can be stored in one or more databases 57. For example, data 56 includes outcomes for quality control, utilization, compliance and fraud control.

Referring to FIG. 3, each service within a defined care integrated pathway is associated with a cost 45 of providing that service which cost can be determined by medical boards and practitioners. Defined care integrated pathways module 44 can identify services by a specialty-specific coding system. The specialty-specific coding system can be associated a code with costs 45 for the service. The providers can differentiate from the determined cost 45 on the basis of the health care professional's experience, qualifications, quality and outcome data, and other features of the service being provided.

Optional value-added benefits module 46 provides selection of additional optional flexible and personalized care benefits, such as specialty care, prescription drug plans, dental and vision. Value-added benefits can promote self-care by employees to achieve better health, leading to less utilization of health care in the long-term through prevention efforts, leading to a better return on investment (ROI) for the employer in-turn, as described in more detail below. Funding for such value-added benefits is available to the employees from their employers, provided in their HMRA account, by way of defined-contributions in the beginning of the year, incentive dividends for appropriate use of healthcare at the end-of-the-year, or employee's own contributions in the account.

The employer can interact with catastrophic care module 42, defined care integrated pathway module 44 and optional value added benefits module 46 for selecting the following: mandatory catastrophic coverage (obtained from existing insurance company as a high-deductible insurance policy, or from a reinsurance/property-casualty insurance company as a policy with specific individual and family stop-loss) and mandatory defined care integrated pathways (defined for the employer and their employee/population group); and optional value-added benefits (which from an employer's perspective, are selected at a group level and show a high ROI/value for their provision). The employee can be responsible for confirming and selecting certain choices made by the employer. For example, the employee can interact with common catastrophic care module 42 in order to select a preference for an insurance carrier (although the employer reserves the right to restrict any modification to their choice). The employee can review the assessment made by the employer for their need for catastrophic coverage in order to purchase additional coverage above the pre-paid catastrophic coverage paid or funded by the employer. The employee can interact with defined care integrated pathways module 44 for providing their personal health information in privacy, in order for the appropriate risk factors to be accounted for before a defined care integrated pathway is determined. Some customization is allowed by the employee for the defined care integrated pathway as this forms the baseline of coverage necessary to protect an individual from inappropriate benefit choices. In contrast, inappropriate benefit choices are highly likely under a traditional defined contribution approach. The employee can interact with optional value-added benefits module 46 and assessment and advisory tools 48 to determine their benefit needs and have full control over how they design their plan through selection of the value-added benefit packages, regardless of who the catastrophic insurance carrier is. For each care and prevention package selected, employees can determine the deductible and co-payments they want to assume. Alternatively, the funding of the employee deductible and co-payments can be through the universal health management system or consumer-centric healthcare model of the present invention, as described below. The employees can also interact with optional value-added benefits module 46 to select a primary care or specialist provider for each of the value-added benefit packages.

Under the universal health management system's "defined care model", when a defined contribution is provided by the employer in the beginning of the year, residual of the contribution 47 which has not been used for the purchase of mandatory health care can be used for 'out-of-pocket' expenses, deductibles and co-payments. The remainder of residual 47 can be stored in HMRA 32. HMRA 32 can invest the savings in mutual funds, bonds and stocks. The investments can be made directly or through integration with an IRA account. Under the consumer-centric, healthcare asset management model of the universal health management system, an alternative funding mechanism is used. The employer sets aside funds to cover employees' healthcare expenses up to the high-deductible amount or specific stop-loss chosen for the catastrophic health insurance policy. If the employees use these funds appropriately/judiciously, by using the provided physician quality, cost information, and wellness information, they receive dividends at the end of the year as an incentive. These funds can again be used by employees for out of pocket expenses, deductibles, and co-payments for value-added benefits/supplementary healthcare coverage, to pay premiums for healthcare coverage if they are unemployed, or save for future/retirement healthcare expenses.

Figure 5:
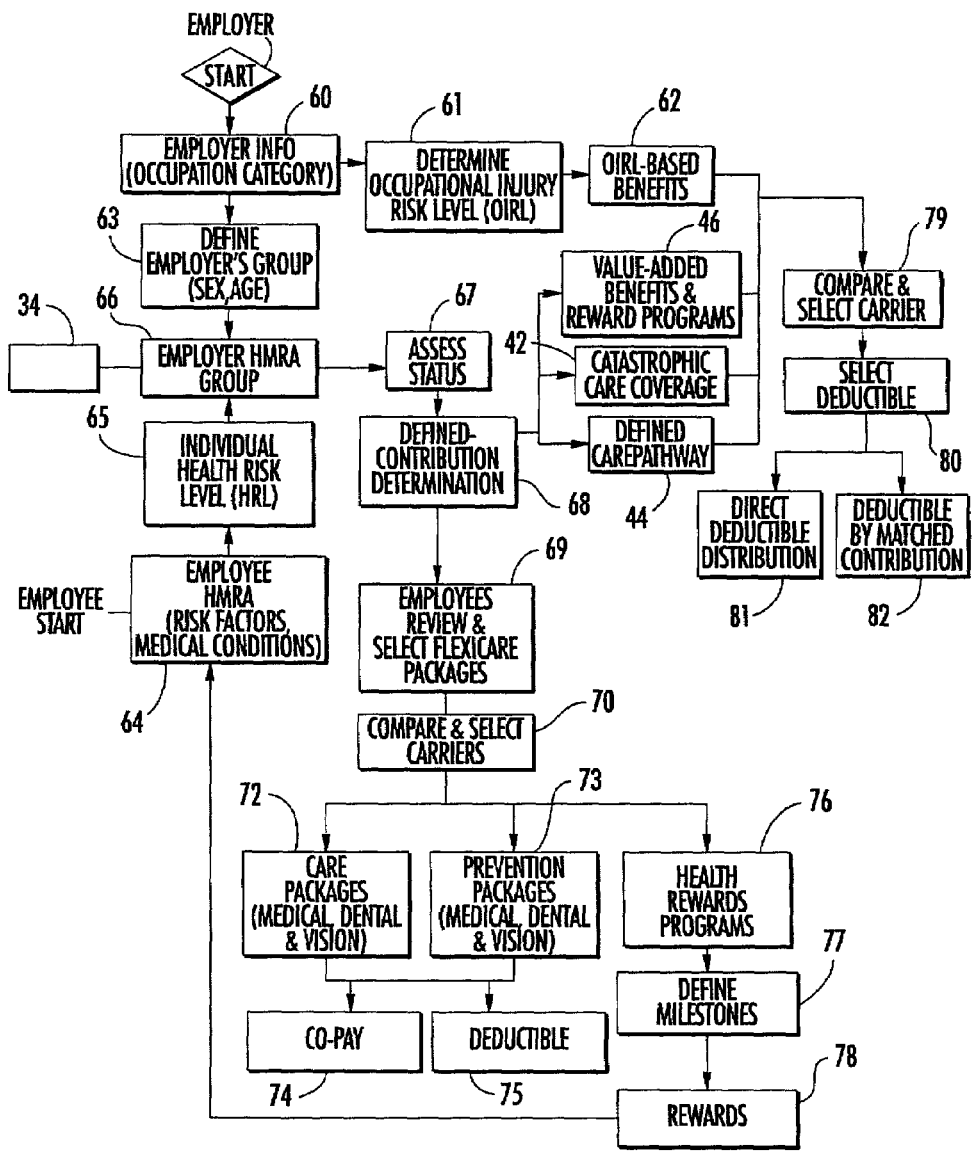
FIG. 5 is a flowchart illustrating an embodiment of a method for establishing the contents of the uniform health management system in accordance with the present invention.

FIG. 5 is a flow diagram of the defined-care model, which describes a process for interacting with the universal health management system (UHM) 20 and health management and retirement account 32. In block 60, employer information is entered into UHM 20 such as by using web interface 31 or television interface 33. The employer information can include an occupation category of their employees. An occupational injury risk level (OIRL) is determined from the entered occupation category, in block 61. In block 62, a determination is made if OIRL-based benefits are applicable. The employer information entered in block 60 can also include information on the employer's group (called a census), which includes such information as gender, marital status, and age of the employees. In block 63, an employer's group can be defined based on the employer information.

In block 64, employee information is entered into UHM 20 such as by using web interface 31 or television interface 33. Employee information can include known personal risk factors, allergies, medications, and medical conditions. In block 65, an individual health risk level (HRL) is determined from the employee information. The employer only has knowledge of the traditional demographics such as name, location, age and sex under HIPAA compliance module 34. Accordingly, there will be complete separation of employees' health information, risk factors and the determined HRL, in full support and compliance with the HIPAA privacy regulations. Architecturally, the system design can physically and logically have two separate database systems, one containing only the demographic information of the individual employee and their dependents, and the other containing their private health/medical information. These two database systems can be connected algorithmically or cryptographically to one another, such as by a unique personal identification number (PIN) based algorithm that is available only to the individual, who is the owner of the HMRA accounts and their information, and to no other stakeholder in the system.

In block 66, an employer HMRA group (a group HMRA account that consolidates the funding of all employees in a group into one aggregated account) is established for creating an individual and personal HMRA 33 for each employee. Thereafter, in block 67, an employee or employer can access status of their respective individual and group HMRA 32. If a contribution has not yet been established, a contribution by the employer for each employee is determined in block 68.

Figure 6A:
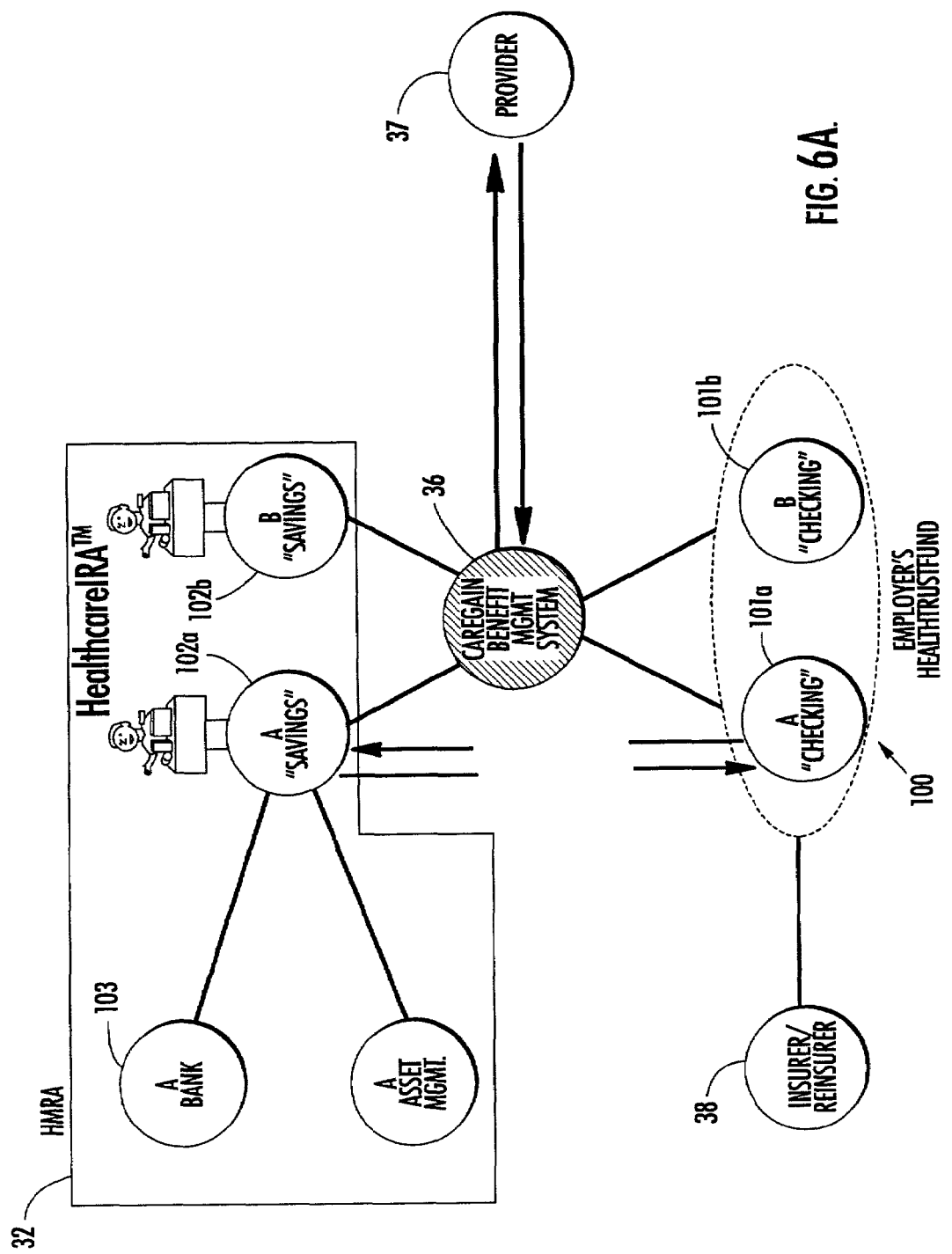
FIG. 6A is a schematic diagram of an implementation of a method for determining a contribution in the universal health care management system in accordance with the present invention.
Figure 7:
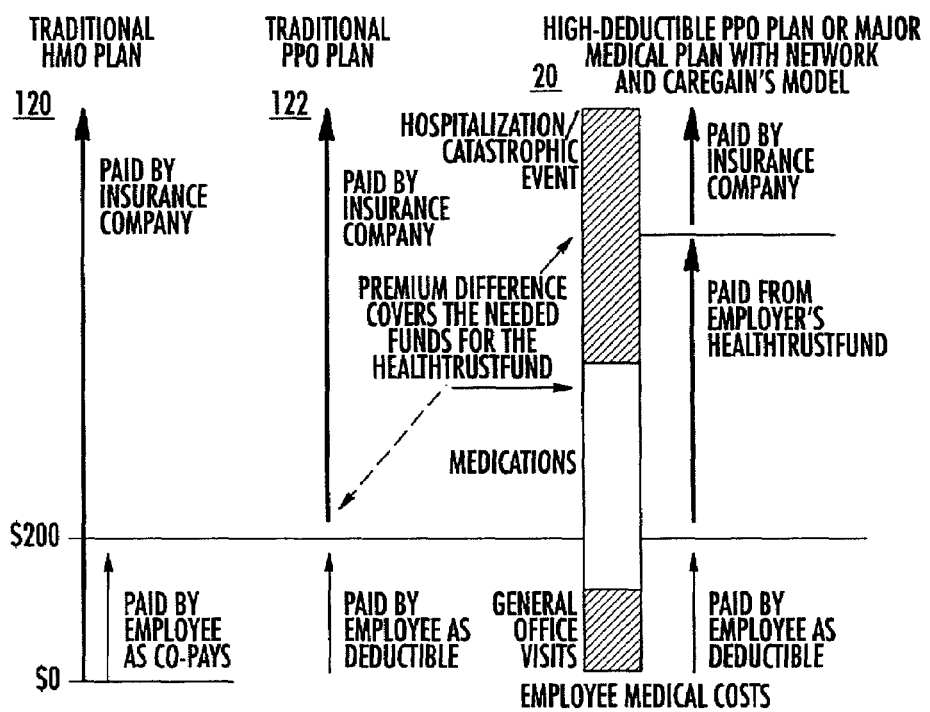
FIG. 7 is a chart illustrating a comparison of funds for medical payments derived for different plans.

FIG. 6A illustrates a schematic diagram of an implementation block 68 for determining a contribution in universal health care management system 20. According to the "healthcare asset management model", the employer establishes employer's health trust fund 100. Employer health trust fund 100 includes an individual trust fund 101a, 101b for each employee. Employer health trust find 100 can be funded from premium savings received by an employer upon purchasing a higher-deductible policy than policies conventionally selected by the employer, as shown in FIG. 7. In prior art HMO plan 120, the employee pays no deductible only co-payments and the insurance company pays all coverage over the co-payment. In prior art POS/PPO plan 122, an employee pays a very small, i.e. $200, deductible and the insurance company pays all coverage over the $200 deductible. In UHM 20, the employer selects a policy having a higher deductible, for example $2500 for single employees and $5000 for family employees. An employee pays the same deductible as previously paid by the employee, such as $200. Employer health trust fund 100 pays all coverage over the deductible paid by the employee, such as $200, up to the higher deductible paid by the employer, such as $2500. This employer's health trust fund acts like a "checking" account, for example of a bank, and clears payments for healthcare services for the employees from the individual low deductible, such as $200, and with a maximum exposure of up to the high-deductible selected by the health plan policy, such as $2500 (i.e. $2500–$200=$2300 for example, would be a single employee's "checking" account or health trust fund held by their employer). The insurance company pays all coverage over the $2500 deductible paid from employer health trust fund 100. Accordingly, the amount of funding in the employer health trust fund 100 is the maximum amount the employer will have to pay in claim costs for all employees because the insurance company pays anything over the plan deductible, such as $2500 for each employee.

Figure 8:
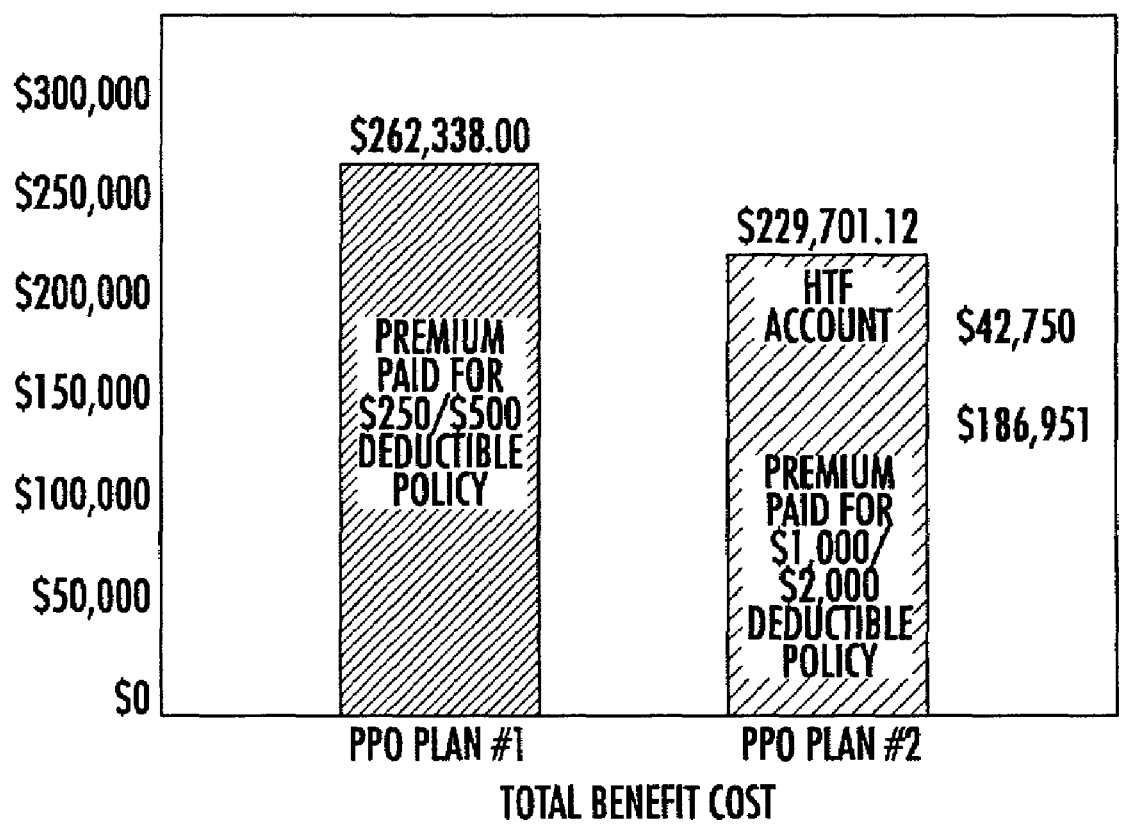
FIG. 8 is a graph illustrating a comparison of the premium amount for a lower deductible policy and a higher deductible policy.

FIG. 8 illustrates an example of funding of employer health trust fund 100 with premium savings due to a higher-deductible policy. In this example, the premium cost for a $250 single deductible/$500 family deductible policy was $262,338.00 per year for 35 employees. The premium cost for a higher-deductible policy of a $1000 single deductible/$2000 family deductible policy was $186,951.12. Accordingly, the savings of premium of the higher-deductible was $75,386.88. Employer health trust fund 100 finds the difference in deductibles for singles of $750 (the $1000 plan deductible amount for singles minus the $250 employee deductible amount) and $1500 for family coverage (the $2000 plan deductible amount for family employees minus the $500 employee deductible amount). In this example, $42,750.00 was funded by the employer trust fund 100 for the difference in deductibles of all employees. In this example, the health trust fund is funded in an amount less than the premium savings from the higher-deductible policy resulting in a savings to the employer of $32,636.88.

According to recent health care utilization statistics, 75% of employees use less than $1000 of health care in a year, and 94% of employees use less than $2500 of health care in a year. Only 6% of the employees use or need greater amounts of health care. Accordingly, it is unlikely that the employees collectively will use all of the funds in employer health trust fund 100. In the above example, all employees must use $1000 if single coverage or $2000 if family coverage to exhaust health trust fund 100.

Referring to FIG. 6A an incentive in the form of dividend 102 of a percentage of unused funds in employer trust fund 100 can be returned to an employee that does not utilize the entire amount of their respective individual trust fund or the so called "checking" account 101a, 101b. The incentive promotes better health care management and utilization by the employee, and has the potential of curtailing healthcare costs by a significant proportion for the employer in the immediate and long-term. HMRA 32 can include individual health care "savings" account 102a, 102b which are established for each employee. Respective dividends from individual health trust funds 101a, 101b are received in individual health care savings account 102a, 102b. For example, health care savings accounts 102a, 102b can be established as a "savings" account and individual health trust funds 101a, 101b can be established as a "checking" account at financial entity 103. Financial entity 103 can provide deposits and transfers of money into and between individual health trust fund 101a, 101b and individual health care savings accounts 102a, 102b. Asset management tools 104 can provide financial management tools for individual health care savings accounts, health care investment funds and health risk and liability assessments. Health care savings accounts 102a, 102b can take advantage of proposed roll-over of health care accounts to function as a health care individual retirement account (Healthcare IRA).

Figure 6B:
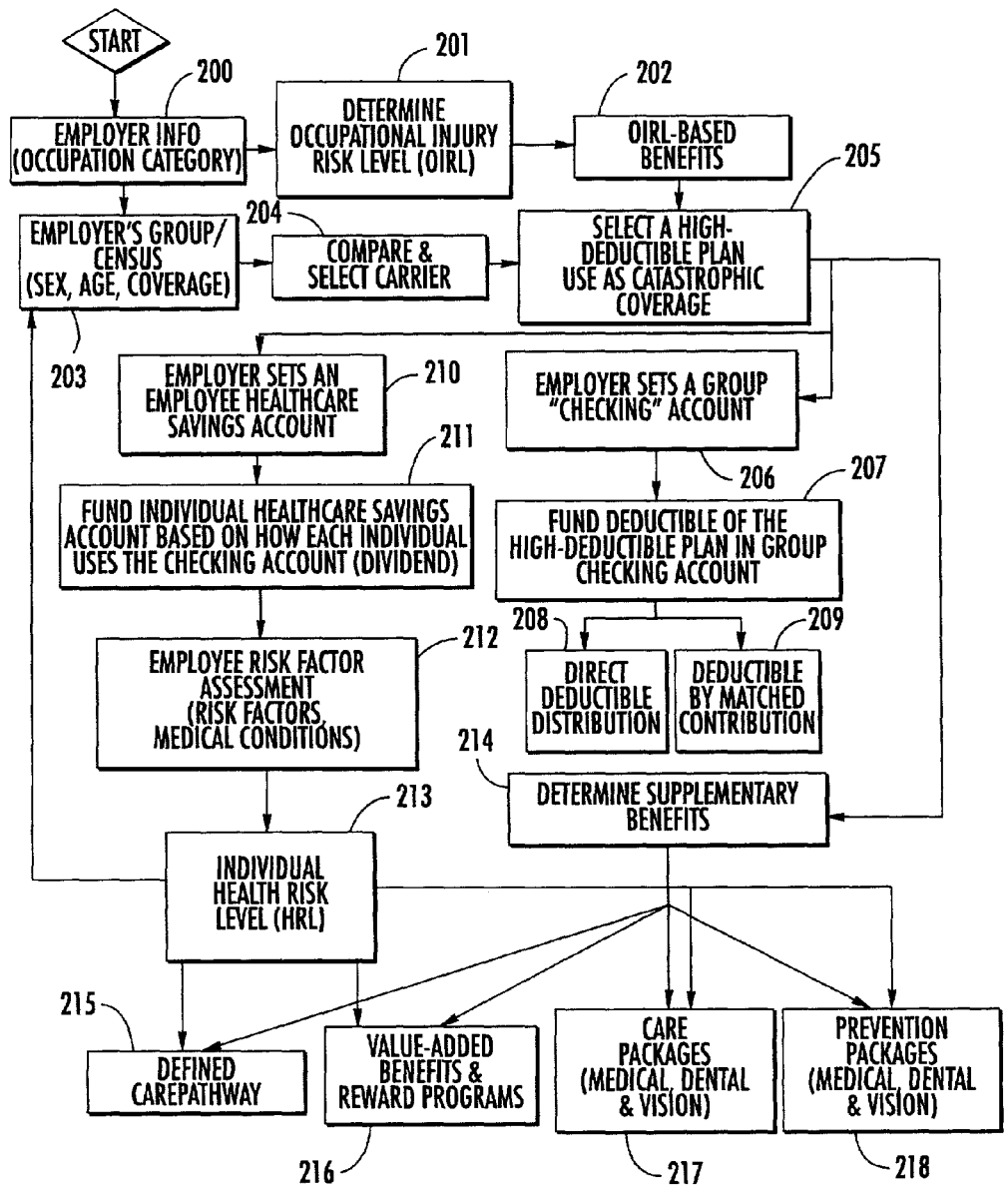
FIG. 6B is a flowchart illustrating an embodiment of a method for a healthcare asset management system in accordance with the present invention.

FIG. 6B is a flow diagram of a process for interacting with the healthcare asset management model. In block 200, employer information is entered into such as by using web interface 31 or television interface 33. The employer information can include an occupation category of their employees. An occupational injury risk level (OIRL) is determined from the entered occupation category, in block 201. In block 202, a determination is made if OIRL-based benefits are applicable. The employer information entered in block 200 can also include information on the employer's group (called a census), which includes such information as gender, marital status, and age of the employees. In block 203, an employer's group can be defined based on the employer information.

In blocks 204 and 205 a carrier is selected which provides a high deductible plan for use as catastrophic coverage. In block 206, an employer determines a group checking account. The group checking account includes an individual checking account for each employee and each account is funded with an amount to cover the deductible of the high-deductible plan and optional amounts over the deductible, in block 207. Thereafter, the selected deductible can be paid by either the employee interfacing with direct deductible distribution module 208 or deductible match contribution module 209, or by the employer directly or by any of the above matching contribution methods.

In block 210, an employer determines an individual employee healthcare savings account. In block 211, the employee healthcare savings account is funded. For example, the employee healthcare savings account can be funded based on a dividend received by the employee based on how the employee used their individual healthcare checking account.

In block 212, employee risk factor information is entered into the healthcare asset management system, such as by using web interface 31 or television interface 33. Employee information can include known personal risk factors, allergies, medications, and medical conditions. In block 213, an individual health risk level (HRL) is determined from the employee information. The employer only has knowledge of the traditional demographics such as name, location, age and sex under HIPAA compliance module 34. Accordingly, there will be complete separation of employees' health information, risk factors and the determined HRL, in full support and compliance with the HIPAA privacy regulations.

Figure 6C:
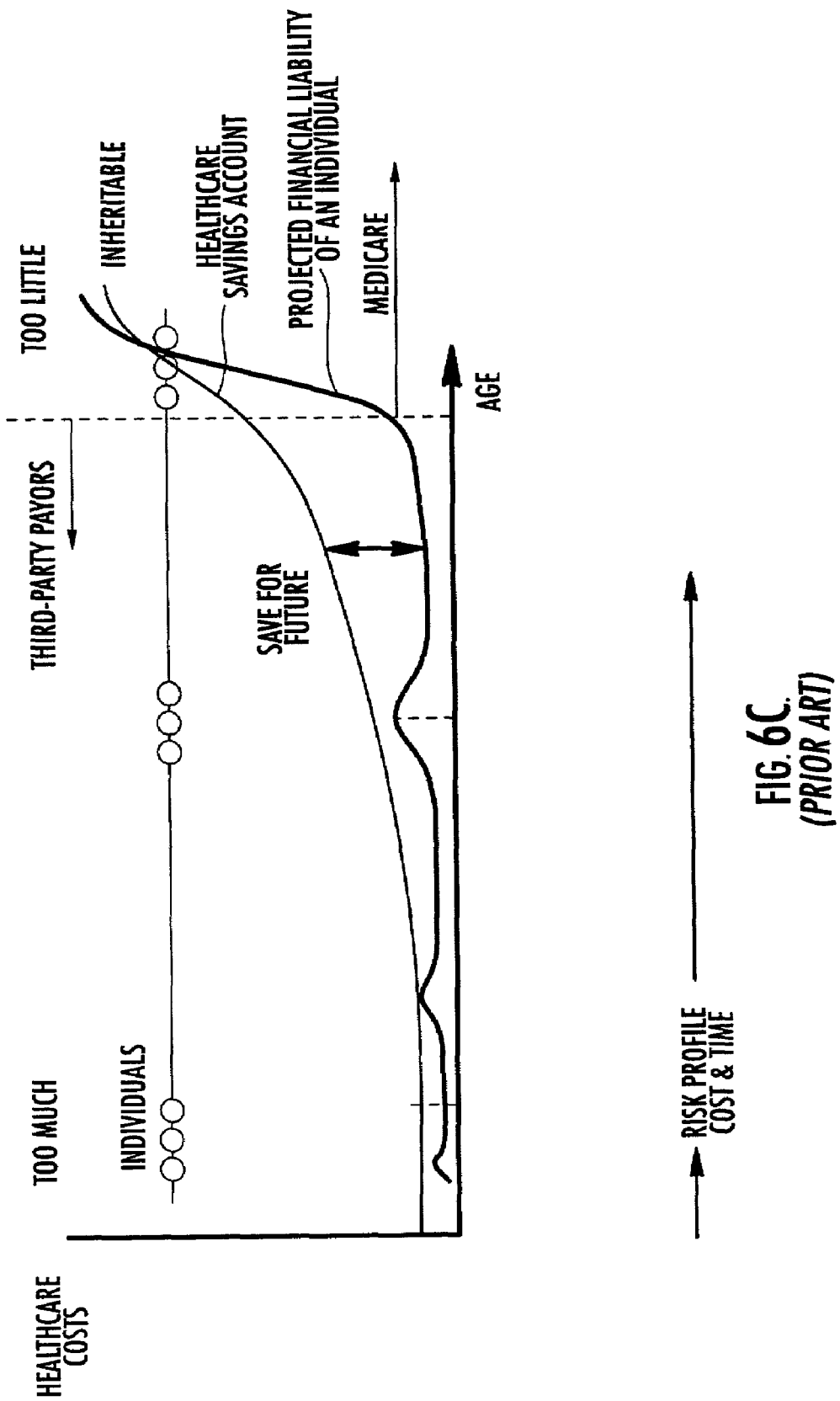
FIG. 6C is a graph comparing prior art benefits with projected financial liabilities and use of health care savings account of the present invention.

Aggregation information related to the individual health risk level can be forwarded to block 203 to be combined with employee census information and used as a health and financial planning tool. As shown in FIG. 6C, prior art health care benefit systems provide too much coverage during a younger age of a patient and too little coverage of an older age of a patient. Aggregation information of individual health risk level can be used to project a financial liability at an older age of a patient. The employee health care savings accounts can be used for the individual to save for their individual projected financial liability. Evidence-based and medicine-based technologies are used to determine based on health risk assessment future health care problems that could result from the risk factors and the cost associated with the treatment of such conditions. This can determine the potential financial liability for which tools can be provided to the employees for determining the appropriate savings and investment strategies for the contribution and dividends they receive in their HMRA to meet the future financial liability.

In block 214, supplementary benefits are selected. The employee can interact with defined care integrated pathways block 215 after providing their personal health information in privacy, to determine a defined care integrated pathway. The employee can interact with optional value-added benefits module 216 to determine their benefit needs and have full control over how they design their plan through selection of the value-added benefit packages, regardless of who the catastrophic insurance carrier is. In block 217, employees can select care packages, such as for medical, dental and vision. In block 218, employees can select prevention packages, such as for medical, dental and vision.

In an alternative embodiment, according to the "defined care model", a contribution can be determined as a defined contribution using the assessment factors important to and associated with an individual in order to determine the defined contribution amount for the employer, and the appropriate benefits for an individual.

Suitable assessment factors are shown in Table 1.

TABLE 1

| Group Risk Assessment | Factors | Description | Individual Risk Assessment - Determination of a Health Risk Level (HRL) |
|---|---|---|---|
| The employer's group as a whole is assessed with innovative risk assessment and optimization tools, based on these factors. The employer is, in | Age | Pediatric Age Groups: 0-12 months, 13-24 months, 2-5 years, 6-10 years, 11-15 years, 16- | Based on these factors, certain personalized care and preventative pathways, plans, and benefit packages are determined, advised and made available to the |

TABLE 1-continued

| Group Risk Assessment | Factors | Description | Individual Risk Assessment - Determination of a Health Risk Level (HRL) |
|---|---|---|---|
| addition, advised of risk factors associated with job conditions and occupation-related exposures, so that specific health and preventative benefits can be pre-determined and paid for determined and paid for by the employer on behalf of the employees for their further satisfaction. An Occupational Injury Risk Level (OIRL) is determined as well, to guide selection of catastrophic coverage. | | 21 years Adult Age Groups: 22-29, 30-35, 36-40, 41-45, 46-50, 51-55, 56-60, 61-65, 66-75, 75+ | individual for building of a personalized and customized health benefit program. |
| | Gender | Male, Female | |
| | Social Factors | Smoker, Drug Use, EtOH Use, Location, Environmental exposures, Occupational Exposures | |
| | Familial Factors | Genetic history, cancer / heart and other disease history | |
| | Genetic History | Pre-disposing genetic information; gene analysis | |
| | Medical History | List of current medical conditions, allergies | |
| | Drug History | Current drug therapies and possible interactions | |
| | Prior Outcomes Data | Prior history of illnesses, their impact, and result | |

A defined contribution sum per employee and overall budget can be determined for the employer's group HMRA. In addition, it is advised to the employer that any additional foreseeable benefits and services, which are either job-related or help to ease the transition of the employee to the defined contribution model, be provided up front and pre-paid. An employer's contribution determination can be determined using the following considerations: enrollment assistance is provided only for traditional demographics (not including health information, and other factors); common catastrophic coverage premium is determined and pre-paid; individualized and mandatory defined care integrated pathway premium is determined and pre-paid as a whole sum; and additional optional benefits employer wishes to provide, including, health benefits, exposure prevention, and health reward programs.

The deductible, which is funded by the employer since the employer selects a high-deductible policy to provide catastrophic coverage to the employees, can be provided to the employees for other expenses and benefits by means of multiple methods. It can be provided as such, the entire amount minus the employee portion of the deductible. It can be a matched contribution by the employer to encourage a greater contribution by the employee towards their own health care and in their HMRA account. The matched contribution can comprise contributing X % of the selected deductible amount and the remainder contributed as a matched contribution to employee's contribution. Accordingly, a greater amount can be accumulated in the employee's HMRA 32 for coverage of out-of-pocket payments and co-payments on benefits selected, while also allowing a mechanism by which the employer can ensure that their choice of a certain defined contribution amount (especially if lower than what was recommended) can be covered by employer and employee's joint contribution.

An employee's contribution determination can be determined based on the Health Risk Level (HRL). The following are algorithmically determined for determining the contribution: specific stop-loss policy and premium for catastrophic coverage best suited for the individual (which may or may not exceed the employer's pre-paid amount, following exclusion of standard and occupational-related catastrophic coverage); the defined care pathway with pre-determined set of care and preventative services, selected specifically for an individual based on his/her HRL and statistical inference; optional flexible care and prevention plans and packages and benefits that are recommended for that individual, and available based on employee's own perception of their "upcoming" health needs; and optional incentive and reward benefits that the individual can benefit from both for their health and financially.

The employee is encouraged to contribute their own funds towards their HMRA with the following incentives: all funds contributed have longevity and do not expire at the end of the year if not claimed; funds can be used as a debit card transaction for virtually eliminating the need for submitting "claims" for reimbursement of the out-of-pocket expenses; a greater flexibility for what can be covered as a "health care expenditure" for payment is provided, as described below; employees can increase the funds into their account by taking full advantage of the deductible by matched contribution feature, allowing up to a maximum determined by the employer to be provided in matched contribution to each employee; and any residual funds in the account, not utilized for the purchase of health care benefits, can be rolled over into financial products, or combined with 401(k) or IRA's.

Referring to FIG. 5, in block 69, employees can review and select value added benefits. Based on the selection of value added benefits, employees can compare and select carriers in block 70. In block 72, employees can select care packages, such as for medical, dental and vision. In block 73, employees can select prevention packages, such as for medical, dental and vision. In blocks 74 and 75, an amount of a co-pay and deductible is determined for the care packages and prevention packages. In block 76, employees can select participation in health rewards programs. Employees can select to enroll in health rewards programs that will provide both cash and health benefits as incentives, for individuals to achieve certain milestones, related to prevention of disease through elimination of risk factors. For example, health reward programs can include a smoking cessation program, a weight loss program and the like. If the employee has selected participation in a health reward program, milestones for the health reward program are established in block 77 and rewards are established in block 78.

Catastrophic care module 42, value added benefits and rewards module 46 and defined integrated health care pathway module 44 are executed and combined with information from OIRL-based module and results are inputted into compare and select carrier module 79. Compare and select carrier module 79 determines a carrier for providing each of the health care benefits. In block 80, a "high" deductible is selected by the employer. Thereafter, the selected deductible can be paid by either the employee interfacing with direct deductible distribution module 81 or deductible match contribution module 82, or by the employer directly or by any of the above matching contribution methods.

Figure 9:
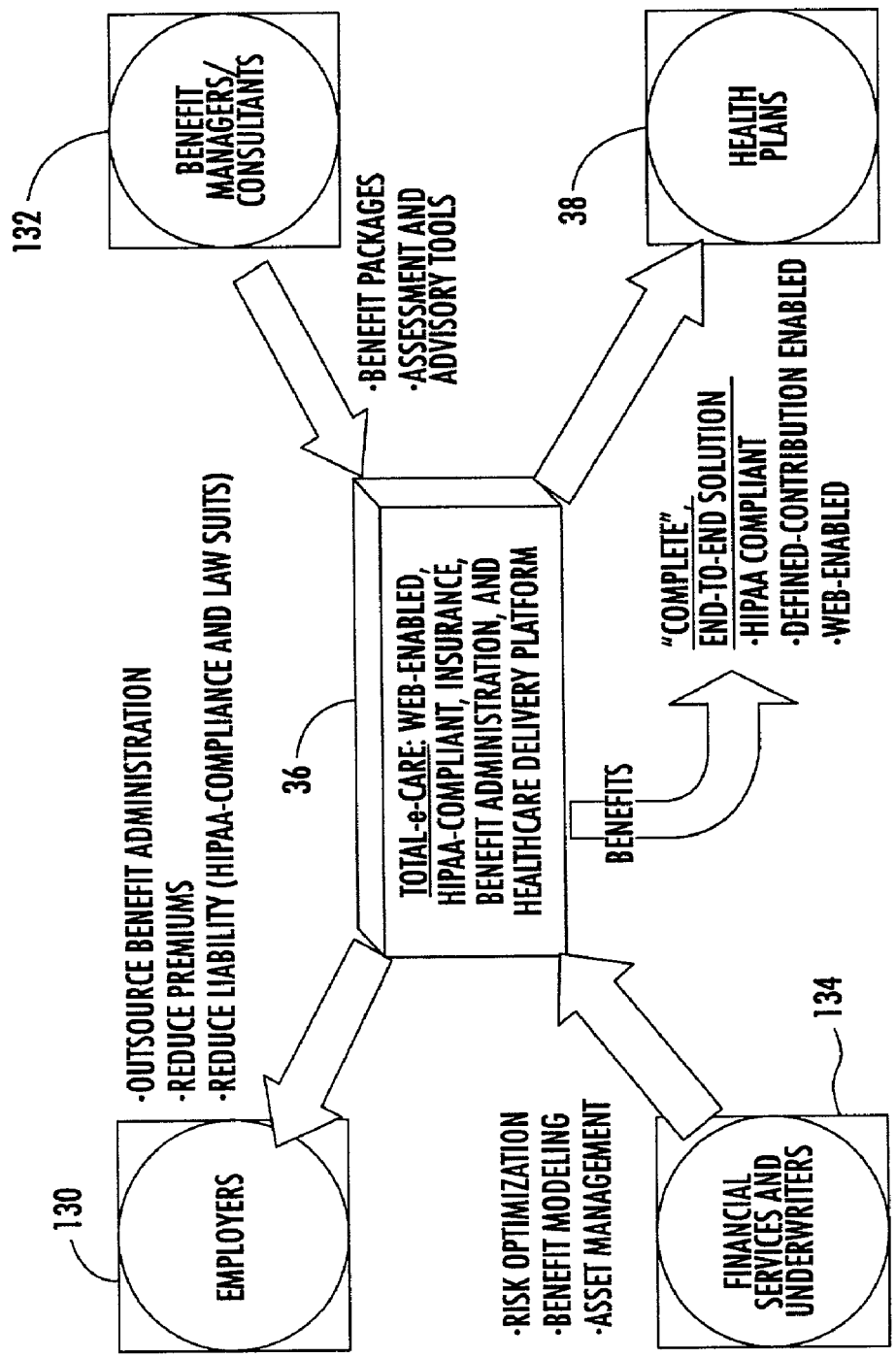
FIG. 9 is a schematic diagram illustrating the interface of exemplary health care "stakeholders" with the integrated health care technology platform according to the present invention.

Referring to FIG. 6A, integrated health care technology platform 36 is the functional component behind the HMRA 32, and the connectivity and interface tool for the employers, providers, and the health plans. The interface of various "stakeholders" in health care services with integrated health care technology platform 36 is shown in FIG. 9. Employer interface 130 interfaces the employer with integrated health care technology platform 36 to provide the employer with the advantages of reducing premiums, reducing liability for non-compliance with HIPAA, and either outsourced or internal management of healthcare and other employee benefits. Benefit managers/consultants interface 132 interfaces benefit managers and consultants with integrated health service technology platform 36 to provide benefit packages, assessment and advisory tasks, which can be utilized by the employers and employees. Insurance provider interface 38 interfaces insurance providers with integrated health service technology platform 36 to establish a health plan for employees, and provide customer relationship management services to support the resulting employee members and employer client. In addition, the insurance provider interface 38 provides HIPAA compliance for all healthcare transactions that result from the use of the technology platform 36, and include compliance to privacy and confidentiality regulations of the government. Financial services and underwriters interface 134 interfaces financial services and underwriters to integrated health service technology platform 36 to provide risk optimization, benefit modeling and asset management. Accordingly, employers can focus on determining type of health plans and policies to provide their group, setting up accounts to find for healthcare up to a certain financial limit, and determining the amount of contribution to individual HMRA or group HMRA, while the rest of the administration of benefits can be self-directed by employees with assistance by benefit consultants and health plans. The administration of mandatory plans and flexible benefit packages is on a fixed interval basis. The intervals depend on the type of plan or benefit package it is. Administering the plan is on a 24/7/365 basis and is self-directed, i.e. the employee is responsible for its administration, although employer's assistance and online advising services will be provided to facilitate the process. Integrated health service technology platform 36 can provide claims adjudication and funds clearance functionality, which can be streamlined for new business processes and functionalities. Integrated health service technology platform 36 can provide reports on utilization of services by employees/patients both on a retrospective and prospective basis, and providers, and to monitor compliance with defined integrated pathways. Integrated health service technology platform 36 can include a fraud detection module to detect duplicate claims/billing. Integrated health service platform 36 can include data storage for storing all medical payment transactions to allow for reporting for internal use and for later use by pharmaceuticals for physician profiling and directed marketing efforts. Integrated health service platform 36 can include a connector to the electronic medical record systems of the employees' HMRA accounts, so the data on the employer's employee group can be aggregated to determine the appropriate health and wellness programs to provide to the employees, which include, defined care integrated pathways, value added benefits, and health rewards programs, and this is done without infringing on the privacy regulations of HIPAA for handling of individual health information.

UHM system 20 can be used by providers to verify eligibility of a patient and to process claims to get reimbursement for healthcare services provided by the providers in a timely and appropriate manner. Following assessment, contribution determinations for employers and employees, and review and selection of health care benefits and financial products, an enrollment and payment process appropriately aggregates enrollment information and payments from the employers and employees, and submits them to the carriers and financial services companies. The enrollment and premium payments can be HIPAA compliant to conform to all standards for data, communication, security, and privacy.

Figure 10:
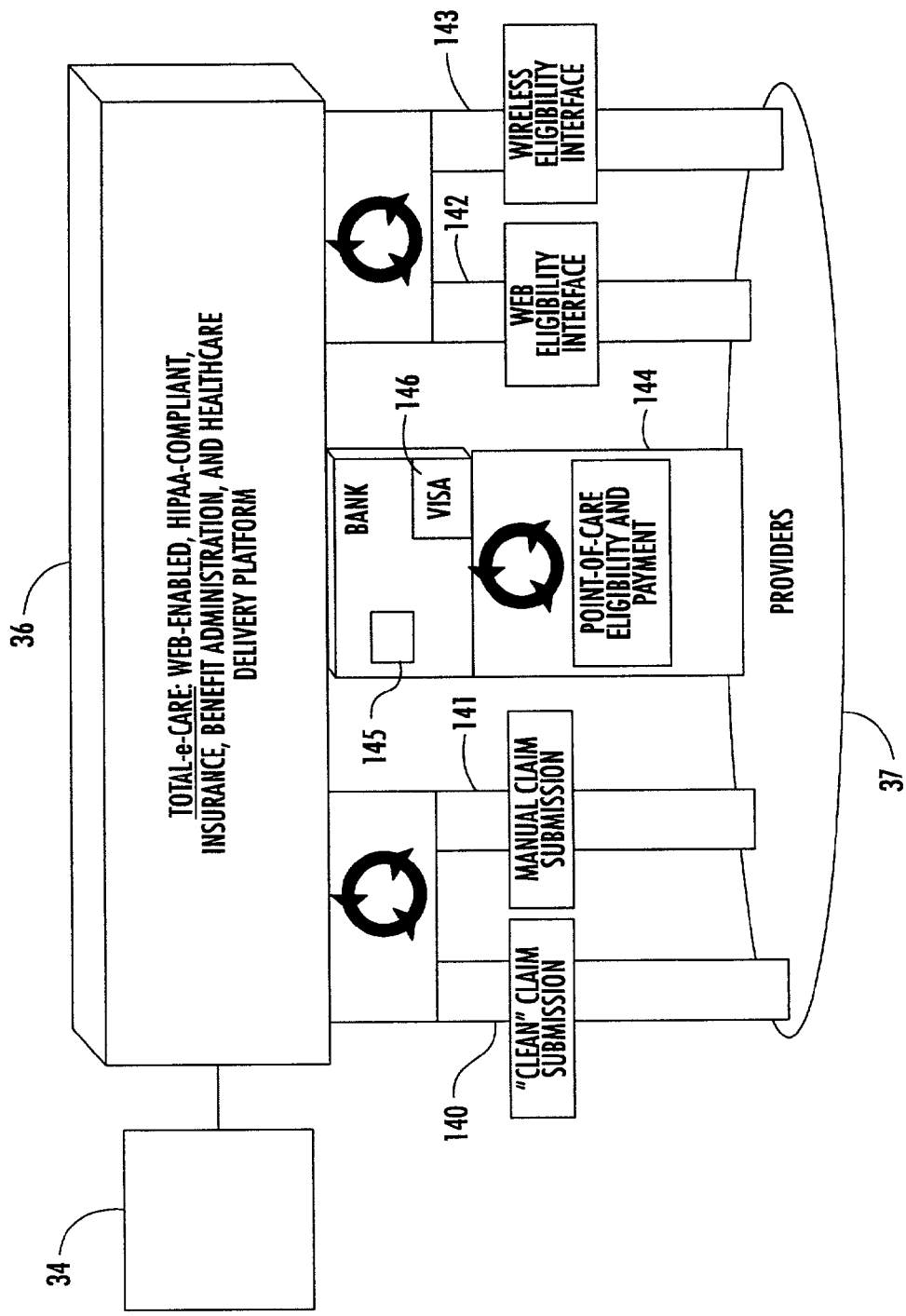
FIG. 10 is a schematic diagram illustrating the interface between health care benefits eligibility, claims processing, and payment processing with the integrated health care technology platform in an embodiment according to the present invention.

Integrated health service platform 36 can provide the technology enablement for such processes to occur. An example of an interface between a service provider and an integrated health service platform 36 is illustrated in FIG. 10.

Clean claim submission module 140 provides submission of "clean" claims between integrated health care technology platform 36 and provider interface 37. A "clean" claim refers to a claim for reimbursement originating from a healthcare provider, which has the appropriate amount of information on the healthcare provider who provided the service, the details of the service provided, the indication for providing the service, and any associated disease, symptom, diagnostic, or testing codes necessary to process that claims efficiently and expeditiously. Provided such information, a "clean" claim can then be processed electronically with payments made to the healthcare provider in a timely manner. Manual claim submission module 141 provides submission of "manual" claims between integrated health care technology platform 36 and provider interface 37. A "manual" claim refers to a claim for reimbursement of services provided by a healthcare provider that includes all information related to the provider's information, service details, indications, and appropriate codes, but is in a paper format. This format requires significant effort on part of the employer or insurance company to collect all of the information necessary to process that claim in a timely manner. Accordingly, service providers such as doctor's offices can interact with integrated health care technology platform 36 for submission of claims. Clean claim submission module 140 and manual claim submission module 141 interact with HIPAA compliance module 34 for providing HIPAA-compliant real-time electronic claims transactions or batch electronic claims transactions.

Web-based eligibility interface 142 provides eligibility verification of a patient at a point-of-care service provider, such as a doctor's office by the doctor's office accessing integrated health care technology platform 36 over the Internet, any payment systems network, or through pre-encoded information on smart-card systems. Wireless-based eligibility interface 143 provides eligibility verification of a patient at a point-of-care service provider, such as a doctor's office by the doctor's office accessing integrated health care technology platform 36 over a wireless network connection. Point-of-care eligibility and payment module 144 provides eligibility verification at a point-of-care, such as a doctor's office and payment at the point-of-care.

Universal HMRA policy card 145 can be issued to an employee. Universal HMRA policy card 145 can have numbers based from the employee's social security number plus additional digits and letters. Following release of HIPAA identifier regulations, the identification number can be compliant to the unique health identifier for individuals (UHI). Universal HMRA policy card 145 can integrate with biometric devices, such as thumb print reading and retinal scan devices. Universal HMRA policy card can interface with a payment network selected from a payment network selected from the group consisting of: a check clearance network, a credit card clearance network, ATM network, Internet network, private network and public network. Universal HMRA policy card 145 can have a magnetic strip to allow it to be used as a debit card/payment card for point-of-care settlement of payments due for services that require out-of-pocket payments or to pay for deductibles and co-payments, and can include more sophisticated capabilities to process actual claims for healthcare. Universal HMRA policy card 145 can be used at the doctor's office, hospitals, any health care institution, pharmacies, and for online health care e-commerce transactions. Universal HMRA policy card 145 can be equipped with a data chip such as a smartcard, lasercard, or any storage device, and the like, to carry data regarding eligibility for benefits, a medical record of a user and can also be used for security. Universal HMRA policy card 145 can be issued for a lifetime, associated with the individual's HMRA account which is also provided for the individual employee and each of their dependents as a lifetime account, which is portable and inheritable, and the data contained in the data chip can be updated on an annual basis at any of the locations including, an employer's human resources department, at home through a home computer, or a provider's office. It can also be updated in the future at an ATM/bank machine. Alternatively, a conventional credit or debit card 146 can be used for providing payment to providers.

Integrated health care technology platform 36 is built on HIPAA-compliant module 34. Components of HIPAA include: communication and data standards (health plan related transactions and health care coding sets); privacy standards (all policies and procedures required to protect patient confidentiality and medical records); security standards (administrative and physician safeguards, as well as, technologies and other technical mechanisms); and identifiers (to identify uniquely every individual, employer, health plan, and provider).

Figure 11:
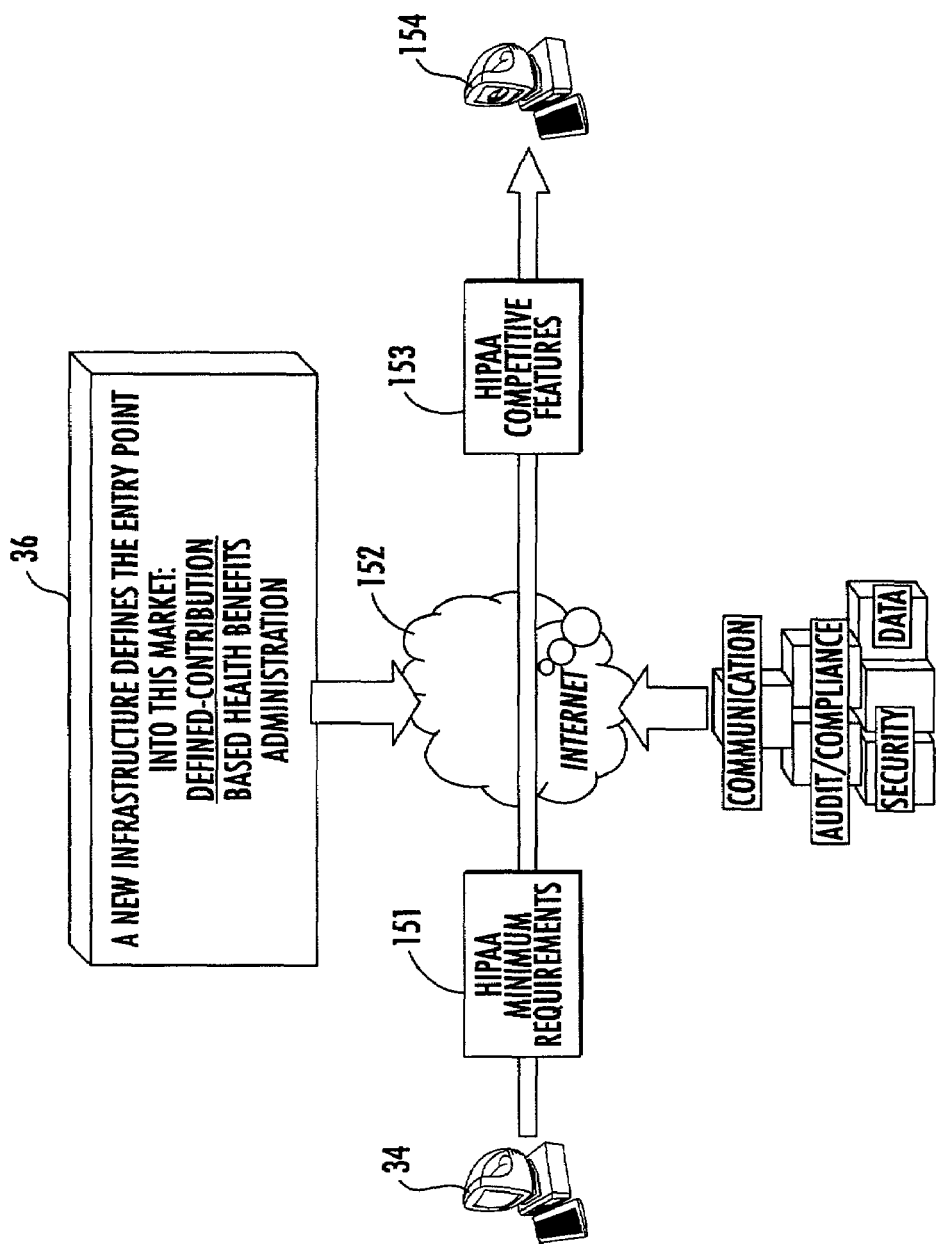
FIG. 11 is a schematic diagram showing an integrated uniform health care system to satisfy compliance requirements over a technology platform according to the present invention.

Integrated health care technology platform 36 integrates all of the above required compliance components into a uniquely integrated system, while leveraging this infrastructure to build on top new business processes and functionalities, such as the above HMRA system to enable implementation of consumer-centric health plans, while being completely web-enabled to provide a complete solution to the health plans, employers, and providers. The integrated system is illustrated schematically in FIG. 11.

HIPAA compliance module 34 provides HIPAA minimum requirements 151 over Internet 152 to integrated health care technology platform 36. HIPAA requirements and features 153 of HIPAA compliance module 34 can include communication, audit/compliance with HIPAA requirements and security of data. HIPAA competitive feature 153 is provided to an employee or employer interface 154 over Internet 152.

The use of a universal health management system attempts to solve the specific disadvantages which derive from the conventional defined contribution transition, while exploiting the opportunities provided by the state of the health care industry to provide a solution to the general consumer, the employers, the providers, and the health plans. Advantages of using the universal health management system include the use of: an integrated model of defined contribution, defined benefit, defined care, and medical savings/retirement benefits that can ease the transition of the industry to a new model of health benefits selection and payment and administration of the same. The universal health management system provides a universal, consumer-driven, flexible and portable benefits delivery system, with a high level of security to protect patient confidentiality while being fully compliant and adaptable to relevant privacy regulations, where consumers have a complete choice, and freedom for determination of where and how their health care benefit funds are used and what health services are obtained from those funds, creating an increasingly transparent health care system for the consumers. The universal health management system provides for the first time, an economic incentive to the patients/consumers for using healthcare services appropriately or judiciously, allowing for better consumer-decision making, as a means of controlling rising healthcare costs for the employers. The care of patients, and payments for health services provided are all defined by the providers and medical institutional boards in the universal health management system, and not just the health insurance carriers, and the patterns obtained from retrospective provider billing data leads to further intelligent pricing rules and standardization of costs.

Consumer-focused benefit packages can be: developed by consumer oriented benefit administration organizations and benefit consultants; statistically modeled by risk optimization experts, financial engineers/financial institutions, and underwriters; customized by health insurance carriers; and delivered and administered through the HMRA 32, integrated health care technology platform 36 and on HIPAA-compliance module 34 of the present invention. The universal health management system provides intelligent risk assessment, advisory, guidance and planning tools that deliver consumers the proper set of guidelines, information, and knowledge to make more informed decisions about their health care benefits, while removing the employer from that role. In the system of the present invention, the employer does not need to participate in day-to-day administration of the health care benefits for their employees. The employees take on a greater role in managing or administering their benefits, relieving employer of some of these duties, that will have further positive impact on the costs for the employers. The insurance carriers/HMO's can deliver more consumer-focused health care benefits, that provide coupling of benefits with disease management and prevention initiatives to control the costs of rising health expenditures predominantly related to management of chronic illnesses. In the universal management care system of the present invention, providers can receive payments for services provided on a real-time, point-of-care basis, with additional channels provided for "clean" claims submission and reimbursement. These channels for payment and other point-of-care services are delivered by way of any global network (i.e. credit card or debit card network, check clearance network, Internet, Intranet, smart card systems, television networks/media, satellite, or any such form or global communication networks available that can be provided with an interface to the providers).

Defined care integrated pathways provide the advantages of: being predictable to achieve standardization of services to reduce costs and to monitor utilization; a standard cost structure for services provided for any given condition can be created, allowing the fee-for-service model to proliferate in a more controlled environment, by setting this cost structure as the baseline for medical reimbursements; allows for continuity of care as the care pathway can be episodic or lifetime; allows comparisons between physicians to occur to determine quality of care and pricing differences; outcomes can be measured and can be tied to a standard of care, or any variance from such standard, to provide input for further development and customization of the care pathways over the long-term; and medical errors can be reduced through application of the care pathways in medical record systems.

In sum, the invention provides a revolutionary new approach to the management of individual assets such as health care benefits which commonly are affected by government regulation and other in-flux rules which benefits the asset holders the asset givers and the various other stakeholders in the asset, such as health care providers and health care plans. The new approach is realized by the combination of a health management and retirement account for the asset holder, and a technology-driven infrastructure that allows the asset giver (e.g., the asset holder's employer) to outsource a significant percentage of the effort associated with defining, redefining and administering the assets and that allows all of the asset holders and stakeholders to interface efficiently to the best advantage of all. The data which passes through the technology platform can be collected and manipulated to provide still further benefits to the stakeholders and optionally to third parties, such as pharmaceutical companies and research institutes.

The various methodologies described above are provided by way of illustration only and should not be construed to limit the invention. Those skilled in the art will readily recognize various modifications and changes may be made to the present invention without departing from the true spirit and scope of the present invention. Accordingly, it is not intended that the invention be limited, except as by the appended claims.

What is claimed is:

1. A system for managing health care assets with a plurality of management strategies comprising:

means for establishing an account for at least one individual;

means for determining an appropriate amount of a defined contribution to establish a health care asset for at least one individual in the account;

means for employer selection of mandatory health care benefits for the at least one individual that includes a mandatory high deductible catastrophic care benefit;

means for determining a proportion of the defined contribution to be allocated for the mandatory health care benefits;

means for automatically deducting the determined proportion from the defined contribution;

means for offering the at least one individual a selection of optional health care benefits the cost of which may be offset in whole or in part by the amount of the defined contribution remaining in the account after the amount of the defined contribution to be allocated for the mandatory health care benefits is deducted;

means for receiving from the at least one individual an identification of one or more of the optional health care benefits; and means for deducting the cost in whole or in part of the one or more of the optional health care benefits from the account.

2. The system of claim 1 further comprising means for providing the at least one individual with descriptive information and advice concerning the optional health care benefits.

3. The system of claim 1 further comprising means for permitting the at least one individual to invest a proportion of the amount in the account.

4. The system of claim 1 further comprising means for accessing the account over the Internet.

5. The system of claim 1 wherein the means for determining an appropriate amount of the defined contribution includes determining mandatory health care benefits for each of the at least one individual based on a population group and an individual health risk level associated with each of the at least one individual.

6. A computer program product for use with a system for managing health care, the computer program product comprising:

a computer usable medium, having program code embodied in the medium for causing the computer system to interface over a communications medium such as the Internet or another network between at least one consumer of health care services and other stakeholders in health care services, the other stakeholders including at least one health benefits plan, at least one health care services provider, and at least one contributor of a defined contribution to the at least one consumer, wherein the program code:

recognizes a total health care asset amount corresponding to and unique to the at least one consumer;

allocates a proportion of the total health care asset amount for mandatory health care benefits, the mandatory health care benefits including at least a mandatory high deductible catastrophic care benefit, the mandatory catastrophic care benefit selected solely by the at least one contributor of the defined contribution to the at least one consumer;

determines the cost of the mandatory health care benefits;

permits the at least one consumer to select from optional health care benefits;

receives from the consumer a selection of at least one of the optional health care benefits;

calculates the cost of any optional health care benefits selected; and deducts automatically the cost of the mandatory health care benefits from the total health care asset amount and queries the at least one consumer as to whether the remainder of the total health care asset amount or a portion thereof should be applied to the cost of any optional health care benefits selected; and after receiving an affirmative response to the query, deducts at least a portion of the cost of any optional health care benefits selected from the remainder of the total health care asset amount.

7. A method of managing the health care assets of a plurality of consumers of health care services comprising:

maintaining a database embodied on a computer, the database containing statistical information that permits characterization of consumers of health care services into population groups based on factors in the group including sex, age and occupation and that permits characterization of a consumer's individual health risk level based on factors in the group including personal risk factors and prior and existing medical conditions;

acquiring information about each of the plurality of consumers;

determining, using the database, a total defined contribution amount to be allocated in an account for each of the plurality of consumers;

determining mandatory health care benefits for each of the plurality of consumers based on the population group and individual health risk level associated with each of the plurality of consumers, the mandatory health care benefits including a mandatory high deductible catastrophic care benefit;

determining the cost of the mandatory health care benefits and calculating the difference between the total defined contribution amount and the mandatory health care benefits to identify a defined contribution remainder in each of the plurality of consumers' accounts;

offering each of the plurality of consumers optional health care benefits for purchase;

if a consumer selects an optional health care benefit, determining the cost of the optional health care benefit;

calculating, for a given optional health care benefit selected by each of the plurality of consumers, whether all or a portion of the cost of the optional health care benefit can be offset by the defined contribution remainder; and reporting the result of the calculation to each of the plurality of consumers.

* * * * *